United States Patent [19]
Finkbeiner

[11] Patent Number: 5,746,858
[45] Date of Patent: May 5, 1998

[54] METHOD OF AFFIXING TRIM STRIP FOR WINDSHIELD INSTALLATION

[75] Inventor: Bradley M. Finkbeiner, Ann Arbor, Mich.

[73] Assignee: James M. Deimen, Pinckney, Mich.

[21] Appl. No.: 448,804

[22] Filed: May 24, 1995

[51] Int. Cl.⁶ ..................................................... B60J 10/02
[52] U.S. Cl. .................. 156/108; 52/204.597; 52/204.7; 296/93
[58] Field of Search .................... 52/208, 716.1, 52/716.5, 204.591, 204.597, 717.03, 717.05, 468, 464, 204.62, 204.69, 204.7; 296/93, 84.1, 85, 90, 96.12, 201; 428/120; 156/108, 295

[56] References Cited

U.S. PATENT DOCUMENTS

| | | | |
|---|---|---|---|
| 3,744,201 | 7/1973 | Dochnahl | 52/400 |
| 4,165,119 | 8/1979 | Hedeen et al. | 296/93 |
| 4,441,755 | 4/1984 | Endo et al. | 52/204.597 X |
| 4,502,259 | 3/1985 | Smith | 52/208 |
| 4,712,826 | 12/1987 | Omori | 296/93 |
| 4,765,673 | 8/1988 | Frabotta et al. | 52/208 X |
| 4,840,001 | 6/1989 | Komisawa | 52/208 |
| 4,843,763 | 7/1989 | Mesnel | 296/93 X |
| 5,174,623 | 12/1992 | Yada et al. | 296/93 |
| 5,273,338 | 12/1993 | Gooding et al. | 52/208 X |
| 5,396,746 | 3/1995 | Whitmer | 52/208 |

*Primary Examiner*—Michael Safavi
*Attorney, Agent, or Firm*—James M. Deimen

[57] ABSTRACT

A trim strip of "T" shaped cross-section having an appendage on the stem. The appendage extends outwardly and downwardly in cross-section away from the top of the "T". The purpose of the appendage is to clear old adhesive debris and any new adhesive from the clearance space between the windshield and the car body. The trim strip is retained in place by adhesive strips applied to one or both undersides of the top of the "T" which grip the windshield or car body or both. The "T" trim strip with the downwardly canted appendage is specifically directed to the aftermarket windshield replacement market but may be used in original equipment installations.

1 Claim, 1 Drawing Sheet

METHOD OF AFFIXING TRIM STRIP FOR WINDSHIELD INSTALLATION

BACKGROUND OF THE INVENTION

The field of the invention pertains to trim strips adapted to cover and seal seams and openings between glass panes and supporting frames. In particular, the invention pertains to extruded plastic or rubber molding used to cover and seal the peripheral opening about a windshield or rear window of an automobile or other vehicle.

Modern trim strips for windshield installation are typically an extruded "T" section having various appendages on the stem of the "T". The appendages are generally canted upwardly toward the top of the strip to wedge the stem between the windshield edge and the adjacent car body panel that frames the windshield.

U.S. Pat. No. 3,744,201 discloses a trim strip that is "barbed" on the stem to wedge into a "U" shaped member. The "U" shaped member fits into and indirectly supports the windshield. The "U" shaped member clamps over the edge of the car body panel that has the windshield opening. In U.S. Pat. No. 4,165,119 the appendages on the stem are substantially more extended and directly engage both the edge of the windshield and the body panel. The stem and appendages are substantially submerged in curable adhesive sealant.

U.S. Pat. No. 4,441,755 discloses a trim molding stem wherein the appendages extend only to one side of the stem to engage the edge of the glass. A second stem extends from the head of the "T" to engage the peripheral wall of the windshield opening and thereby inhibit movement of the trim strip relative to the body panel.

In U.S. Pat. No. 4,502,259 the stem includes appendages extending from one side only into the adhesive sealant. The appendages are not intended to engage the peripheral wall of the car body windshield opening. The other side of the stem directly engages the edge of the windshield. The underside of the head of the stem is relieved by a shallow groove on the windshield side of the stem only.

U.S. Pat. No. 4,712,826 discloses trim strips with stems absent the appendages or with a single appendage extending to the bottom of the stem. The above described trim strips are generally intended as original equipment installations, however, they may be used in the replacement aftermarket installation of windshields and rear windows. With a view toward development of trim strips specifically for the aftermarket wherein certain problems arise that are not common to original installations, the improved trim strip for the aftermarket is disclosed below.

SUMMARY OF THE INVENTION.

The invention comprises further improvements in the extruded "T" shaped section trim strip specifically for aftermarket installation of windshields and rear windows but not necessarily limited thereto.

Modern windshields are installed with a fully hardening adhesive to adhere to a flange surrounding the windshield opening. The fully hardening adhesive is used to prevent ejection of the windshield and possibly the passengers in the event of a vehicular accident. If the hard adhesive fills the clearance space surrounding the edge of the windshield, thermal expansion and contraction of the windshield can cause cracks to form in the windshield. Thus, in aftermarket installations of windshields it is important that the clearance space be kept clean of old adhesive as well as new adhesive.

Rather than rely upon appendages on the stem of the trim strip to retain the strip in place, the new trim strip according to the invention, relies upon adhesive strips or coatings applied to the undersides of the top of the "T" section. Thus, the trim strip adhesively adheres to either the windshield or the adjacent car body, or both.

The stem of the new trim strip is straight with the exception of one appendage that is canted downwardly away from the top of the trim strip. The downwardly canted appendage assists in clearing the clearance space of any old adhesive debris and new adhesive as the trim strip is pushed into place.

DESCRIPTION OF THE PREFERRED EMBODIMENT.

Figure 1:
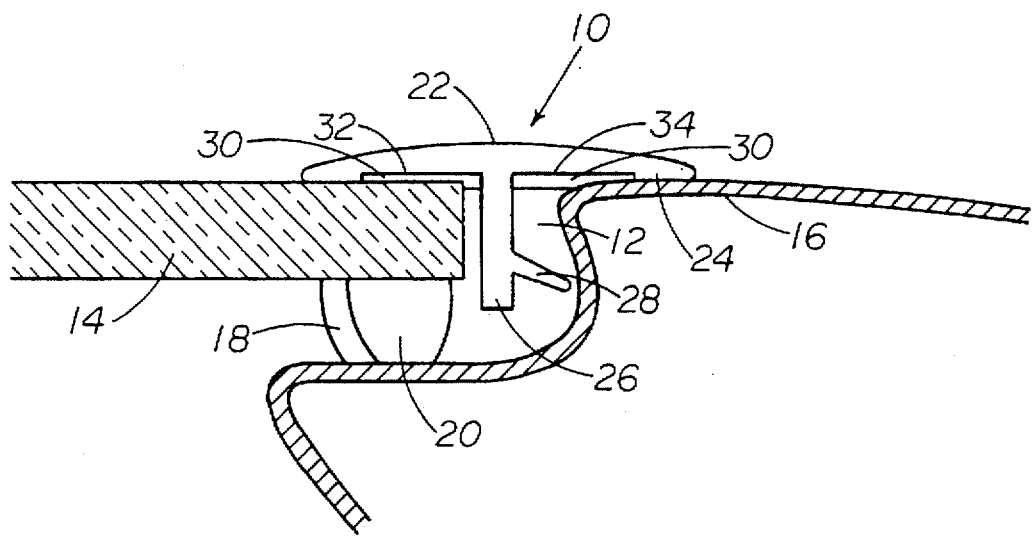
FIG. 1 illustrates in cross-section a trim strip according to the invention positioned between a windshield and a car body portion.
Figure 2:
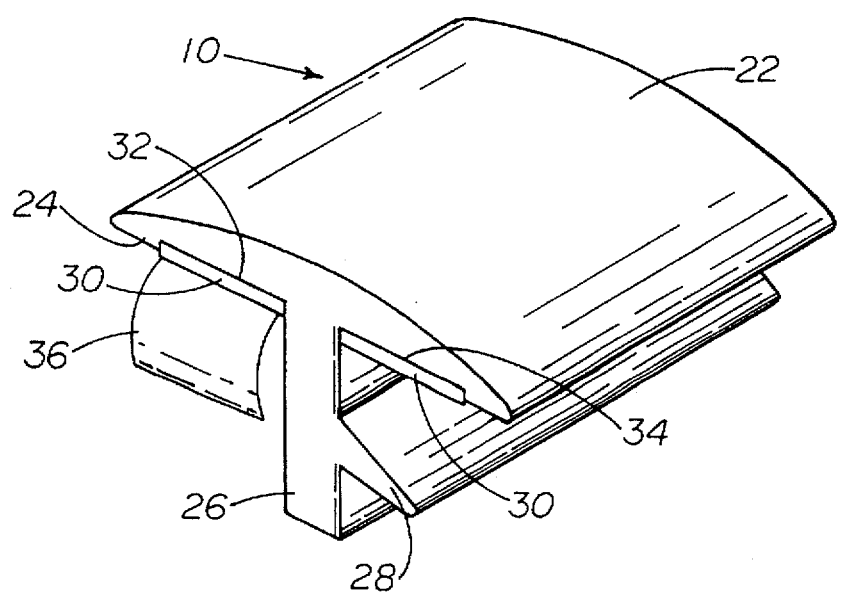
FIG. 2 illustrates a perspective view of a part of the trim strip.

In FIG. 1, a trim strip generally denoted as 10 is shown in cross-section as used. FIG. 2 depicts the trim strip 10 prior to the intended assembly. The trim strip 10 is mounted between and bridges a clearance space or gap 12 between a windshield 14 and a vehicular body 16. Beneath the windshield 14 there is positioned a dam 18 and an adhesive bead 20. The dam 18 controls the placement of the adhesive bead 20. The trim strip 10 is generally extruded in lengths from a flexible material such as plastic or rubber and is comprised of a head 22 that has a crowned contour, an underside 24 to the head 22, and a stem 26 depending from the underside of the head. A downwardly canted appendage 28 extends from the stem 26 to clear the gap 12 from any debris remaining therein perhaps from the removal of a prior installed windshield. Similarly, the depending stem 26 also helps keep the gap 12 open by resisting or limiting movement of the adhesive bead 20 into the gap 12.

The trim strip 10 is held in place to the windshield 14 and the vehicular body 16 by means for attaching such as two sided tape 30. The underside 24 of the head has recesses, 32, 34 on either side of the depending stem 26. The two sided tape 30 can be fitted into the recesses, 32 34. The two sided tape 30 has a protective cover 36 as shown in FIG. 2, to protect the adhesive quality of the tape until the trim strip 10 is used. The advantage of the canted appendage 28 is to clear and keep the gap open and free of debris. The open gap 12 greatly facilitates expansion and contraction of the windshield and vehicular body due to thermal variances. Accordingly, thermal stresses on both of these parts at the point of juncture are reduced substantially.

In use, the dam 18 is placed on the vehicular body 16. An adhesive bead 20 is thereafter situated adjacent the dam 18 but leaving a space between the bead and wall of the vehicular body. The windshield 14 is then located on the adhesive bead 20. The covers 36, 36 are detached from the two sided tapes and the trim strip 10 is pressed into position with one of the two sided tapes engaging the windshield 14 and the other of the two sided tapes engaging the vehicular body 16. As the trim strip 10 is pressed into position, the downwardly canting appendage 28 on the stem 26 of the trim strip clears and maintains the gap 12 for the purpose of thermal expansion and contraction.

I claim:

1. A method of installing a windshield comprising the steps of, placing a dam on a vehicular body, disposing an adhesive bead adjacent the dam leaving a space between the bead and a wall of the vehicular body, placing the windshield on the adhesive bead, removing cover strips protecting two sided tape on either side of a depending stem on the underside of a trim strip, the depending stem having a downwardly canted appendage, positioning the trim strip to adhere one of the two sided tapes to the windshield and another of the two sided tapes to the vehicular body whereby the depending stem of the trim strip extends into the space between the bead and the wall of the vehicular body and the downwardly canted appendage on the depending stem clears debris from the space thereby allowing the space to be clear for thermal contraction and expansion.

* * * * *